March 14, 1961 G. L. HAUGEN ET AL 2,975,300

PULSE WIDTH CONTROL FOR MULTIVIBRATORS

Filed May 1, 1957

GLENN L. HAUGEN
GEORGE D. WOFFORD
INVENTOR

BY
Killman and Kerst
ATTORNEYS

United States Patent Office 2,975,300

Patented Mar. 14, 1961

2,975,300

PULSE WIDTH CONTROL FOR MULTIVIBRATORS

Glenn L. Haugen and George D. Wofford, Baltimore, Md., assignors to The Bendix Corporation, a corporation of Delaware Filed May 1, 1957, Ser. No. 656,287

4 Claims. (Cl. 307—88.5)

This invention relates to monostable multivibrators and is directed to the provision of a means for controlling the duration of the pulse output of a plurality of multivibrators without any interaction between the multivibrators by way of the control means.

It is known to control such circuits singly by means of a potentiometer connected directly or by way of a capacitor to an electrode of one of the stages. This, however, when used as a common control means for more than one multivibrator connects the multivibrators in a manner such that a change of state in one multivibrator applies a voltage change to the other which affects its operation.

It is an object of this invention to control the operation of a plurality of monostable multivibrators by a common control means which isolates the respective multivibrators from each other and thus prevents interaction.

It is a further object of the invention to provide such a control means which is simple and which may be used for the control of a single multivibrator, if desired.

These and other objects and advantages of the invention are realized in a control means employing a respective transistor connected in the collector leg of the first stage of each multivibrator to be controlled, with a common potentiometer connected to the base electrode of all the transistors of the control means. If desired, a single control transistor may be used to control a plurality of multivibrators by connecting its emitter in the collector legs of their first stages.

Figure 1:
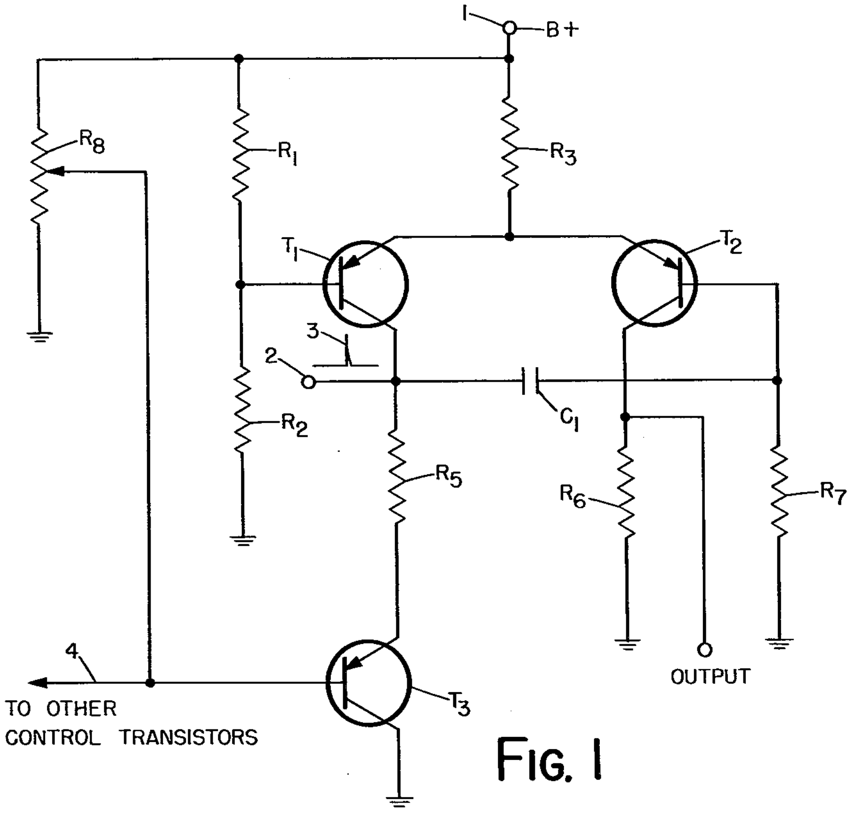
Fig. 1 is a schematic diagram of *a* circuit embodying the invention.
Figure 2:
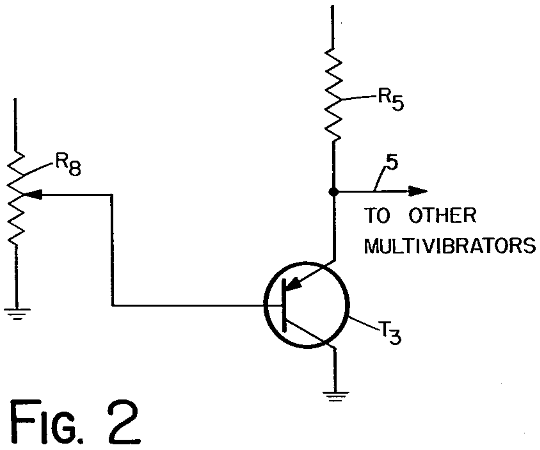
Fig. 2 is a schematic diagram of a fragment of a modification of the circuit of Fig. 1.

The multivibrator shown in Fig. 1 comprises a pair of transistors $T_1$ and $T_2$ indicated as being of the PNP junction type, with their emitters connected by way of a common resistor $R_3$ to a positive terminal 1 of a source of supply voltage indicated as B+. This terminal is connected to ground through a pair of serially connected resistors $R_1$ and $R_2$, the junction of which is connected to the base of $T_1$. The collectors of $T_1$ and $T_2$ are connected to ground through respective resistors $R_5$ and $R_6$. The collector of $T_1$ is coupled to the base of $T_2$ by a capacitor C. The base of $T_2$ is connected to ground through a resistor $R_7$. There is provided a terminal 2, connected to the collector of $T_1$, at which is applied to the multivibrator a series of positive-going triggering impulses indicated by the graph 3. In considering the operation of this portion of the circuit, it may be assumed that the lower terminal of resistor $R_5$ is connected to ground.

The portion of the circuit which has been described constitutes a monostable multivibrator in accordance with the prior art. In its operation the circuit is normally so biased by the voltage divider $R_1$, $R_2$ that the transistor $T_1$ is cut off with the voltage at the base of $T_1$ somewhat positive with respect to that at its emitter. $T_2$ is conducting to saturation with the voltage at its emitter substantially equal to that at its collector and the voltage at its base negative with respect thereto.

The application of a triggering impulse 3 at terminal 2, causes the collector of $T_1$ to become more positive and the base of $T_2$ to do likewise. This reduces conduction in $T_2$, making the emitters of both $T_1$ and $T_2$ become more positive and initiating conduction in $T_1$. Conduction in this transistor causes its collector to go more positive and the base of $T_2$ to follow. This regenerative action culminates in a complete reversal of the original conductive state, with $T_2$ cut off and $T_1$ conducting to saturation. The voltage at the base of $T_2$ now begins to fall toward ground accompanied by current flow through $R_7$ and $R_5$. The values of $R_7$ and $R_5$ govern the rate of current flow and thus determine the pulse duration.

The conventional way of controlling the duration of the pulses of the multivibrator output is either by means of a variable form of $R_7$ or by introducing a bias voltage in the collector leg of $T_1$. The latter expedient has been accomplished by a potentiometer connected across the supply voltage source.

In providing a unitary control for a number of multivibrators, the ganging of a number of variable resistors such as $R_7$ would introduce unwanted mechanical linkages and the provision of a number of connections to a common potentiometer would introduce the likelihood of interaction between the voltages on the collector leg of the first stages of the various multivibrators.

In accordance with the invention a transistor $T_3$ is added to the circuit with its emitter connected to $R_5$ and its collector connected to ground. A potentiometer $R_8$ is connected across the source of supply voltage with its slider connected to the base of $T_3$. As indicated in Fig. 1, by the conductor 4, the slider may also be connected to the base electrodes of other transistors such as $T_3$ for the control of other multivibrators.

In the operation of this form of the invention, the emitter of $T_3$ will assume a voltage level which is substantially equal to that impressed on the base by the position of the slider on potentiometer $R_8$. In the absence of $T_3$ the collector of $T_1$ would be at a substantially ground level. The base of $T_2$ would, in the state of saturation of that transistor, be operating at a level somewhat above nine volts, considering a twelve volt supply voltage and $C_1$ will charge to somewhat above three volts. When triggering occurs, the collector of $T_1$ will rise to around nine volts with the establishment of conduction therein and the base of $T_2$ will rise to around eighteen volts. From this point the voltage will decay exponentially toward ground as $C_1$ discharges through $R_7$, $T_1$ and $R_3$. The time required for this decay to reach a level slightly below that of the emitter of $T_2$ determines pulse duration.

If we assume a setting of $R_8$ such that three volts exists on the base of $T_3$, the emitter of that transistor will assume a level substantially equal to three volts. Thus, the voltage to which $C_1$ will charge will be reduced by approximately three volts and when $T_1$ begins conducting the voltage at the base of $T_2$ will rise to substantially fifteen volts, rather than eighteen. Since the time required for the decay from this level is less than from eighteen volts, the pulse duration will be shortened.

The application of the control voltage to other transistors $T_3$ will not cause interaction between the controlled multivibrators since voltage changes on their emitters, due to the operation of their associated multivibrators, will not greatly change the voltages of their bases.

The emitter to collector dynamic impedance of the transistor $T_3$ is so small as to have negligible effect on the operation of the associated multivibrator. For this reason, a single transistor $T_3$ can be used to control a plurality of multivibrators without interaction, as in Fig.

2, in which connections to the collector legs of the first stages of a plurality of multivibrators are made to the emitter of $T_3$ as by the conductor 5.

While the control transistor has only been shown in the collector leg of the first stage, it can also be used in the same position in the base leg of the second stage. In the latter position an increase in bias voltage on the base electrode of the control transistor will lengthen recovery time rather than shorten it, since it will increase the level toward which the base of the second stage falls after triggering, thus requiring a proportionally greater discharge of $C_1$ to initiate current flow in $T_2$.

While the above control means has been described as applied to the simultaneous control of a plurality of multivibrators, it can be used equally as well for the control of a single multivibrator.

What is claimed is:

1. In combination with a monostable multivibrator comprising a pair of amplifying stages, having regenerative feedback means coupling said stages, a source of supply voltage connected to said stages, means capacitively coupling the output of a first of said stages to the input of the second, a resistive discharge network for said capacitive coupling means, means for charging said capacitive coupling means, means normally biasing said first stage to cut-off, and means applying triggering impulses to said capacitive coupling means; control means for said multivibrator comprising: a transistor having its emitter terminal connected in series with said charging network and its collector terminal connected directly to a terminal of said source, whereby the charge current of said capacitive coupling means flows between said collector and emitter, and means impressing a direct current voltage on the base of said transistor.

2. In combination with a monostable multivibrator comprising a pair of transistor amplifying stages, having their emitters connected by way of a common resistor to the positive terminal of a source of supply voltage, a capacitor coupling the collector of the first of said stages to the base of the second, respective resistors coupling the collector and the base of said second stage to the negative terminal of said source, a resistor connected to the collector of said first stage, means biasing said first stage to cut-off and means applying a series of triggering impulses to said first stage in a manner to reverse the conductivity of said stages; control means for said multivibrator comprising: a transistor having its collector and emitter terminals connected in series with said resistor connected to the collector of said first stage and means applying a variable direct current, voltage to the base of the last named transistor.

3. In combination with a plurality of monostable multivibrators, each comprising a pair of amplifying stages having regenerative feedback means coupling said stages, a source of supply voltage connected to said stages, means capacitively coupling an output terminal of a first of said stages to an input terminal of the second, a resistive discharge circuit for said capacitive coupling means, means for charging said capacitance coupling means, means normally maintaining said first stage at cut-off and means periodically applying a triggering voltage to the junction of said output terminal and said capacitive coupling means; common control means for said multivibrators comprising: a transistor having its collector-emitter discharge path connected serially between a respective one of said charge means and a terminal of said source of supply voltage, a source of adjustable direct current voltage and means applying voltage therefrom to the base electrodes of each of said transistors.

4. In combination with a plurality of monostable multivibrators, each comprising a pair of amplifying stages having regenerative feedback means coupling said stages, a source of supply voltage connected to said stages, means capacitively coupling an output terminal of a first of said stages to an input terminal of the second, a resistive discharge circuit for said capacitive coupling means, means for charging said capacitance coupling means, means normally maintaining said first stage at cut-off and means periodically applying a triggering voltage to the junction of said output terminal and said capacitive coupling means; common control means for said multivibrators comprising a transistor having its collector-emitter charge path connected serially between said charging means of each of said multivibrators and a terminal of said source, a source of adjustable direct current voltage and means applying voltage therefrom to the base electrode of said transistor.

References Cited in the file of this patent

UNITED STATES PATENTS

| | | |
|---|---|---|
| 2,562,295 | Chance | July 31, 1951 |
| 2,598,516 | Dickinson | May 27, 1952 |
| 2,641,717 | Toth | June 9, 1953 |
| 2,787,727 | Maure et al. | Apr. 2, 1957 |
| 2,827,574 | Schneider | Mar. 18, 1958 |
| 2,903,607 | Danner et al. | Sept. 8, 1959 |

FOREIGN PATENTS

| | | |
|---|---|---|
| 251,520 | Switzerland | Aug. 2, 1948 |